(12) United States Patent
Takeichi et al.

(10) Patent No.: US 11,333,546 B2
(45) Date of Patent: May 17, 2022

(54) COMBINATION WEIGHING APPARATUS WITH IMPROVED HOPPER ATTACHMENT WORKABILITY

(71) Applicant: Ishida Co., Ltd., Kyoto (JP)

(72) Inventors: Shinji Takeichi, Ritto (JP); Naomi Imaaki, Ritto (JP); Atsushi Takahashi, Ritto (JP); Koji Araki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 124 days.

(21) Appl. No.: 16/975,336

(22) PCT Filed: Mar. 11, 2020

(86) PCT No.: PCT/JP2020/010641
§ 371 (c)(1),
(2) Date: Sep. 17, 2020

(87) PCT Pub. No.: WO2020/184632
PCT Pub. Date: Sep. 17, 2020

(65) Prior Publication Data
US 2021/0215529 A1 Jul. 15, 2021

(30) Foreign Application Priority Data
Mar. 13, 2019 (JP) .............................. JP2019-046126

(51) Int. Cl.
*G01G 13/18* (2006.01)
*G01G 19/387* (2006.01)
(Continued)

(52) U.S. Cl.
CPC ........... *G01G 19/387* (2013.01); *B65D 88/26* (2013.01); *B65G 65/34* (2013.01); *G01G 13/18* (2013.01)

(58) Field of Classification Search
CPC .... G01G 13/18; G01G 19/387; G01G 19/393; B65D 88/26; B65G 65/34
See application file for complete search history.

(56) References Cited

U.S. PATENT DOCUMENTS

| 4,807,711 A | * | 2/1989 | O'Brien | ............... | G01G 19/393 |
| | | | | | 177/112 |
| 5,379,923 A | * | 1/1995 | Sagastegui | ............. | G01G 13/18 |
| | | | | | 222/181.2 |

(Continued)

FOREIGN PATENT DOCUMENTS

| CN | 205221687 U | 5/2016 |
| CN | 108713132 A | 10/2018 |

(Continued)

OTHER PUBLICATIONS

The extended European search report issued by the European Patent Office dated Nov. 10, 2021, which corresponds to European Patent Application No. 20767454.0-1001 and is related to U.S. Appl. No. 16/975,336.

(Continued)

*Primary Examiner* — Randy W Gibson
(74) *Attorney, Agent, or Firm* — Studebaker & Brackett PC

(57) ABSTRACT

A combination weighing apparatus 1 includes a pool hopper 5 and a support body 11. An attached portion 30 of the support body 11 has first defining portions 34 and 39 and second defining portions 35 and 40, support portions 36 and 41 capable of supporting a first locking member 24, and guide portions 37 and 42 disposed on the track of a second locking member 25 at a time when the pool hopper 5 is swung to the support body 11 side about the first locking member 24 with the first locking member 24 supported by the support portions 36 and 41 and guiding the second locking member 25 such that the second locking member 25 moves to the lower side in a height direction with respect to a position on the track and is positioned in the second defining portions 35 and 40.

6 Claims, 12 Drawing Sheets

(51) Int. Cl.
   *B65D 88/26*   (2006.01)
   *B65G 65/34*   (2006.01)

(56) References Cited

U.S. PATENT DOCUMENTS

| | | | |
|---|---|---|---|
| 5,611,437 A * | 3/1997 | Okada | G01G 19/303 |
| | | | 209/912 |
| 5,736,683 A | 4/1998 | Howard | |
| 5,959,258 A | 9/1999 | Howard | |
| 6,188,029 B1 * | 2/2001 | Miyamoto | G01G 19/393 |
| | | | 251/303 |

FOREIGN PATENT DOCUMENTS

| | | |
|---|---|---|
| JP | S62249018 A | 10/1987 |
| JP | H09264776 A | 10/1997 |
| JP | 2012237643 A | 12/2012 |
| JP | 2016132568 A | 7/2016 |
| JP | 2018048851 A | 3/2018 |
| WO | 2018/056182 A1 | 3/2018 |

OTHER PUBLICATIONS

Notification of Transmittal of Translation of the International Preliminary Report on Patentability and Translation of Written Opinion of the International Searching Authority; PCT/JP2020/010641; dated Sep. 23, 2021.
International Search Report issued in PCT/JP2020/010641; dated Apr. 7, 2020.

* cited by examiner

COMBINATION WEIGHING APPARATUS WITH IMPROVED HOPPER ATTACHMENT WORKABILITY

TECHNICAL FIELD

The present invention relates to a combination weighing apparatus.

BACKGROUND ART

Patent Literature 1 describes a combination weighing apparatus including a plurality of hoppers temporarily storing an article. In the combination weighing apparatus, each hopper is detachably attached to a support body including a drive unit. In the combination weighing apparatus described in Patent Literature 1, the hopper has four hooks that are spaced apart in the up-down direction and spaced apart in the width direction. The hopper is attached to the support body by each of the four hooks being hooked onto the support body.

CITATION LIST

Patent Literature

Patent Literature 1: Japanese Unexamined Patent Publication No. 2016-132568

SUMMARY OF INVENTION

Technical Problem

In a case where the hopper is attached to the support body in the combination weighing apparatus according to the related art, it is necessary to hook the four hooks onto the support body at the same time. Accordingly, a worker stands in front of the hopper and performs work while horizontally moving the hopper toward the support body. However, in a case where the hopper is attached while being horizontally moved, the attachment position in the support body is hidden by the hopper, and thus it is impossible to perform the attachment work while confirming the positional relationship between the hook and the support body. Accordingly, the attachment workability of the hopper is not satisfactory in the combination weighing apparatus according to the related art.

An object of one aspect of the present invention is to provide a combination weighing apparatus in which the attachment workability of a hopper can be improved.

Solution to Problem

A combination weighing apparatus according to one aspect of the present invention includes a hopper temporarily holding an article and discharging the article and a support body detachably supporting the hopper. The hopper has a main body portion holding the article and an attachment portion attaching the main body portion to the support body. The attachment portion has a first member extending along a width direction of the main body portion and a second member disposed upstream of the first member in a direction of movement of the article in the main body portion and extending along the width direction. The support body has an attached portion to which the attachment portion of the hopper is attached. The attached portion has a first defining portion defining a position of the first member and a second defining portion defining a position of the second member at an attachment position where the hopper is attached to the support body, a support portion disposed between the first defining portion and the second defining portion in a height direction of the support body and capable of supporting the first member, and a guide portion disposed on a track of the second member at a time when the hopper is swung to the support body side about the first member with the first member supported by the support portion and guiding the second member such that the second member moves to a lower side in the height direction with respect to a position on the track and is positioned in the second defining portion.

In the combination weighing apparatus according to one aspect of the present invention, the attachment portion of the hopper has the first member and the second member. The second member is disposed upstream of the first member in the direction of movement of the article in the main body portion. In other words, in the hopper, the first member is disposed on the lower side and the second member is disposed on the upper side. In a case where the hopper is attached to the support body, the first member is brought close to the support portion while the support portion is (visually) confirmed with, for example, the hopper inclined and the first member is supported by the support portion. As a result, the hopper can be temporarily positioned with respect to the support body. In a state where the first member is supported by the support portion, the hopper is swung to the support body side about the first member. As a result, the second member moves to the guide portion. Then, the hopper can be swung about the second member to the support body side when the second member reaches and abuts against the guide portion. The support of the first member in the support portion is released when the hopper is further swung. As a result, the hopper can be moved in the height direction, and thus the second member is positioned in the second defining portion by the second member being moved along the guide portion. When the support in the support portion is released, the first member is positioned in the first defining portion disposed below the support portion. In this manner, the first member is positioned in the first defining portion and the second member is positioned in the second defining portion, and thus the hopper can be attached to the support body. As described above, in the combination weighing apparatus, it is possible to attach the hopper to the support body while confirming the positional relationship between the attachment portion of the hopper and the attached portion of the support body. Accordingly, the attachment workability of the hopper can be improved in the combination weighing apparatus.

In one embodiment, the guide portion may have an inclined surface inclined downward with respect to a horizontal direction and the inclined surface may be inclined in a direction away from the support body in the horizontal direction. When the second member is moved along the inclined surface in this configuration, the first member moves away from the support portion, and thus the support of the first member in the support portion can be released more reliably.

In one embodiment, the guide portion may have a recess portion provided in an upper end portion of the inclined surface and disposed at a position on the track of the second member and a distance between the support portion and the recess portion may be equal to a distance between the first member and the second member of the hopper. In this configuration, it is possible to more reliably release the support of the first member in the support portion by swinging the hopper to the support body side about the second member in the recess portion.

In one embodiment, the attached portion may have an inclined portion disposed below the track of the second member in the height direction and at a position farther from the support body in the horizontal direction than the guide portion, capable of guiding the second member with respect to the second defining portion, and inclined upward with respect to the horizontal direction and the inclined portion may be inclined in a direction away from the support body in the horizontal direction. In this configuration, the second member can be guided with respect to the second defining portion by the guide portion and the inclined portion. Accordingly, the second member can be reliably positioned in the second defining portion. The inclined portion is inclined upward in the direction away from the support body in the horizontal direction. Accordingly, the inlet of the second member with respect to the second defining portion becomes wide. As a result, the second member can be more reliably positioned in the second defining portion.

In one embodiment, the attached portion may have a first support member and a second support member disposed so as to face each other in the width direction, each of the first support member and the second support member may have the first defining portion, the second defining portion, the support portion, and the guide portion, and a distance between the first support member and the second support member in the width direction may decrease upward from the support portion. When the hopper is attached to the support body, the first member is brought close to the support portion while the support portion is (visually) confirmed and the first member is supported by the support portion. At this time, the attached portion may be looked down and it may be difficult for a worker to see the support portion depending on the height position of the support body. In this case, it may not be easy to support the first member on the support portion. In the combination weighing apparatus, the width-direction distance between the first support member and the second support member provided with the support portion decreases upward from the support portion. In other words, in the attached portion, the width of the part above the support portion decreases. As a result, the upper side parts of the first support member and the second support member do not block the view when the attached portion is looked down, and thus it is possible to confirm the support portion. Accordingly, in the combination weighing apparatus, it is possible to bring the first member close to the support portion while confirming the support portion and the first member can be supported by the support portion. As a result, the attachment workability of the hopper can be improved.

In one embodiment, the hopper may be a weighing hopper and the attached portion of the support body may support the weighing hopper. The weighing hopper is disposed below the pool hopper. Accordingly, the position of the attached portion that supports the weighing hopper can be a position looked down by a worker. Accordingly, particularly effective in the attached portion that supports the weighing hopper is a configuration in which the width-direction distance between the first support member and the second support member decreases upward from the support portion.

Advantageous Effects of Invention

The attachment workability of the hopper can be improved according to one aspect of the present invention.

DESCRIPTION OF EMBODIMENTS

Hereinafter, a preferred embodiment of the present invention will be described in detail with reference to the accompanying drawings. It should be noted that the same or corresponding elements will be denoted by the same reference symbols without redundant description in the description of the drawings.

Figure 1:
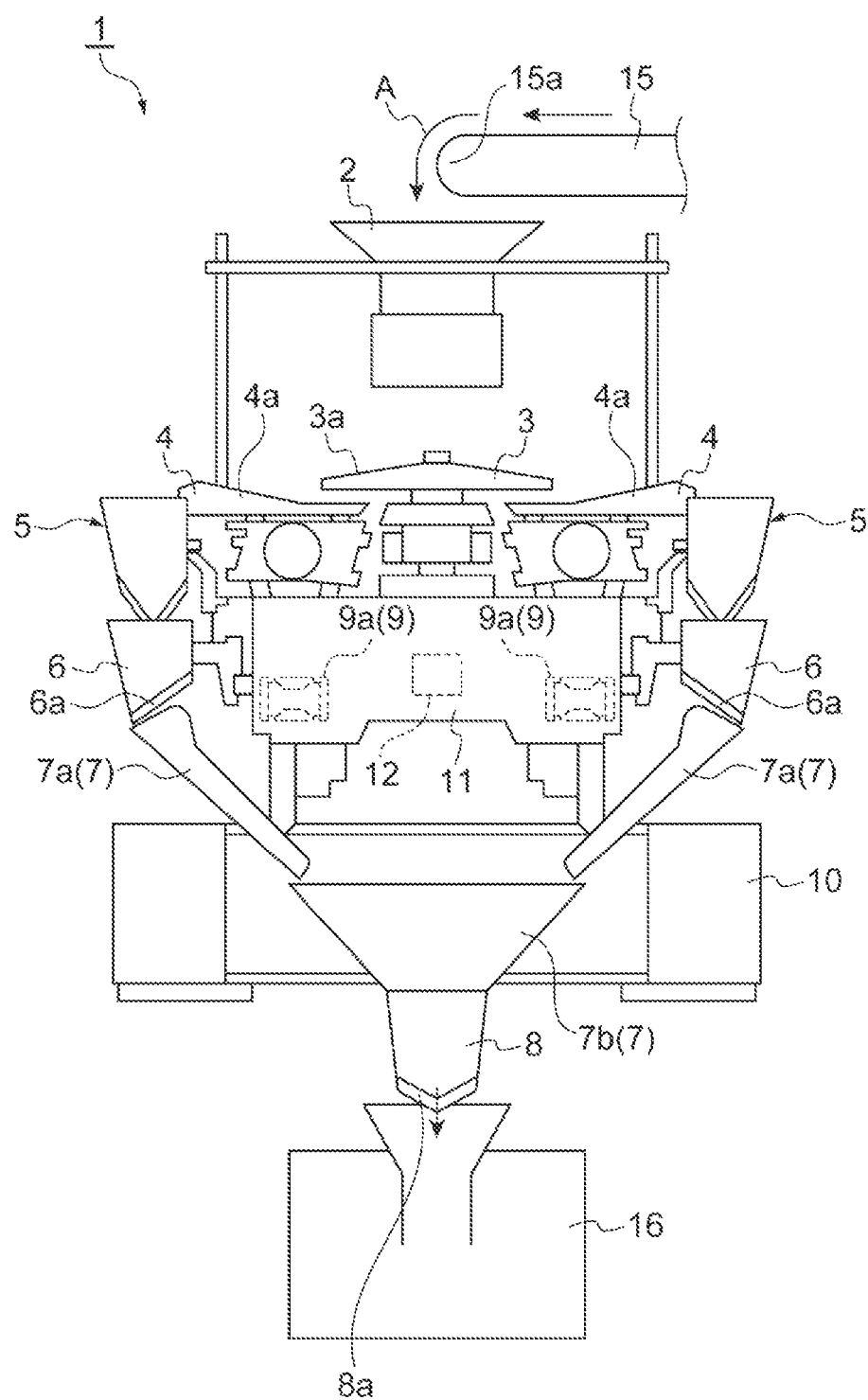
FIG. 1 is a configuration diagram of a combination weighing apparatus according to one embodiment.

As illustrated in FIG. 1, a combination weighing apparatus 1 includes a charging chute 2, a dispersion feeder 3, a plurality of radiation feeders 4, a plurality of pool hoppers 5, a plurality of weighing hoppers 6, a collecting chute 7, a timing hopper 8, and a weighing unit 9.

The combination weighing apparatus 1 weighs an article A (article with a variation in unit mass such as an agricultural product, a marine product, and a processed food) supplied by a transport conveyor 15 so as to reach a target weighing value and supplies the article A to a bag making and packaging machine 16. It should be noted that the bag making and packaging machine 16 bags the article A weighed and supplied by the combination weighing apparatus 1 while forming a film into a bag having a predetermined capacity.

The charging chute 2 is disposed below a transport end 15a of the transport conveyor 15. The charging chute 2 receives the article A transported from the outside by the transport conveyor 15 and dropped from the transport end 15a of the transport conveyor 15 and discharges the article A downward.

The dispersion feeder 3 is disposed below the charging chute 2. The dispersion feeder 3 has a conical transport surface 3a that spreads downward. By the transport surface 3a being vibrated, the dispersion feeder 3 uniformly transports the article A discharged from the charging chute 2 to the top portion of the transport surface 3a toward the outer edge of the transport surface 3a.

The plurality of radiation feeders 4 are radially disposed along the outer edge of the transport surface 3a of the dispersion feeder 3. Each radiation feeder 4 has a trough 4a extending outward from below the outer edge of the transport surface 3a. By the trough 4a being vibrated, each radiation feeder 4 transports the article A discharged from the outer edge of the transport surface 3a toward the tip portion of the trough 4a.

The plurality of pool hoppers 5 are disposed so as to surround, for example, a center line (not illustrated) parallel to the vertical direction. The pool hoppers 5 are respectively disposed below the tip portions of the troughs 4a of the radiation feeders 4. Each pool hopper 5 temporarily stores the article A discharged from the corresponding radiation feeder 4. Each pool hopper 5 discharges the temporarily stored article A downward. The configuration of each pool hopper 5 will be described in detail later.

The plurality of weighing hoppers 6 are disposed so as to surround, for example, the center line. The weighing hoppers 6 are respectively disposed below gates 5a of the pool hoppers 5. Each weighing hopper 6 has a gate 6a, which can be opened and closed with respect to the bottom portion of the weighing hopper 6. Each weighing hopper 6 temporarily stores the article A discharged from the corresponding pool hopper 5 by closing the gate 6a. Further, each weighing hopper 6 discharges the temporarily stored article A downward by opening the gate 6a.

The collecting chute 7 collects the article A discharged from each weighing hopper 6. The collecting chute 7 has upper chute portions 7a and a lower chute portion 7b. The upper chute portions 7a receive the article A discharged from the weighing hoppers 6 and cause the article A to glide to the lower chute portion 7b side. The lower chute portion 7b is a truncated cone-shaped tube body that tapers downward. The lower chute portion 7b discharges the article A to the timing hopper 8.

The timing hopper 8 is disposed below the collecting chute 7. The timing hopper 8 has a gate 8a that can be opened and closed with respect to the bottom portion of the timing hopper 8. The timing hopper 8 temporarily stores the article A discharged from the collecting chute 7 by closing the gate 8a. Further, the timing hopper 8 discharges the temporarily stored article A to the bag making and packaging machine 16 by opening the gate 8a.

The charging chute 2, the dispersion feeder 3, the plurality of radiation feeders 4, the plurality of pool hoppers 5, and the plurality of weighing hoppers 6 are directly or indirectly supported by a support body 11. The support body 11 has a cylindrical shape. The collecting chute 7 and the timing hopper 8 are directly or indirectly supported by a frame 10.

The weighing unit 9 is accommodated in the support body 11 supported by the frame 10. The weighing unit 9 has a plurality of load cells 9a. Each load cell 9a supports the corresponding weighing hopper 6. When the article A is temporarily stored in each weighing hopper 6, the weighing unit 9 weighs a weighing value in accordance with the mass of the article A.

A control unit 12 is disposed in the support body 11. The control unit 12 has a central processing unit (CPU), a read only memory (ROM), a random access memory (RAM), and the like. The control unit 12 controls the operation of each portion of the combination weighing apparatus 1 such as the transport operation of the dispersion feeder 3 and the radiation feeder 4, the opening and closing operation of a gate 21 of each pool hopper 5, the opening and closing operation of the gate 6a of each weighing hopper 6, and the opening and closing operation of the gate 8a of the timing hopper 8.

The control unit 12 stores the weighing value weighed by the weighing unit 9 and the weighing hopper 6 storing the article A corresponding to the weighing value in association with each other. The control unit 12 selects a weighing value combination from a plurality of the weighing values weighed by the weighing unit 9 and associated with the respective weighing hoppers 6 such that the total value becomes the target weighing value. More specifically, the control unit 12 selects the weighing value combination from the plurality of weighing values output by the weighing unit 9 such that the total value falls within a predetermined range in which the target weighing value is the lower limit value of the range. Then, the control unit 12 causes the weighing hopper 6 corresponding to the combination to discharge the article A.

Figure 2:
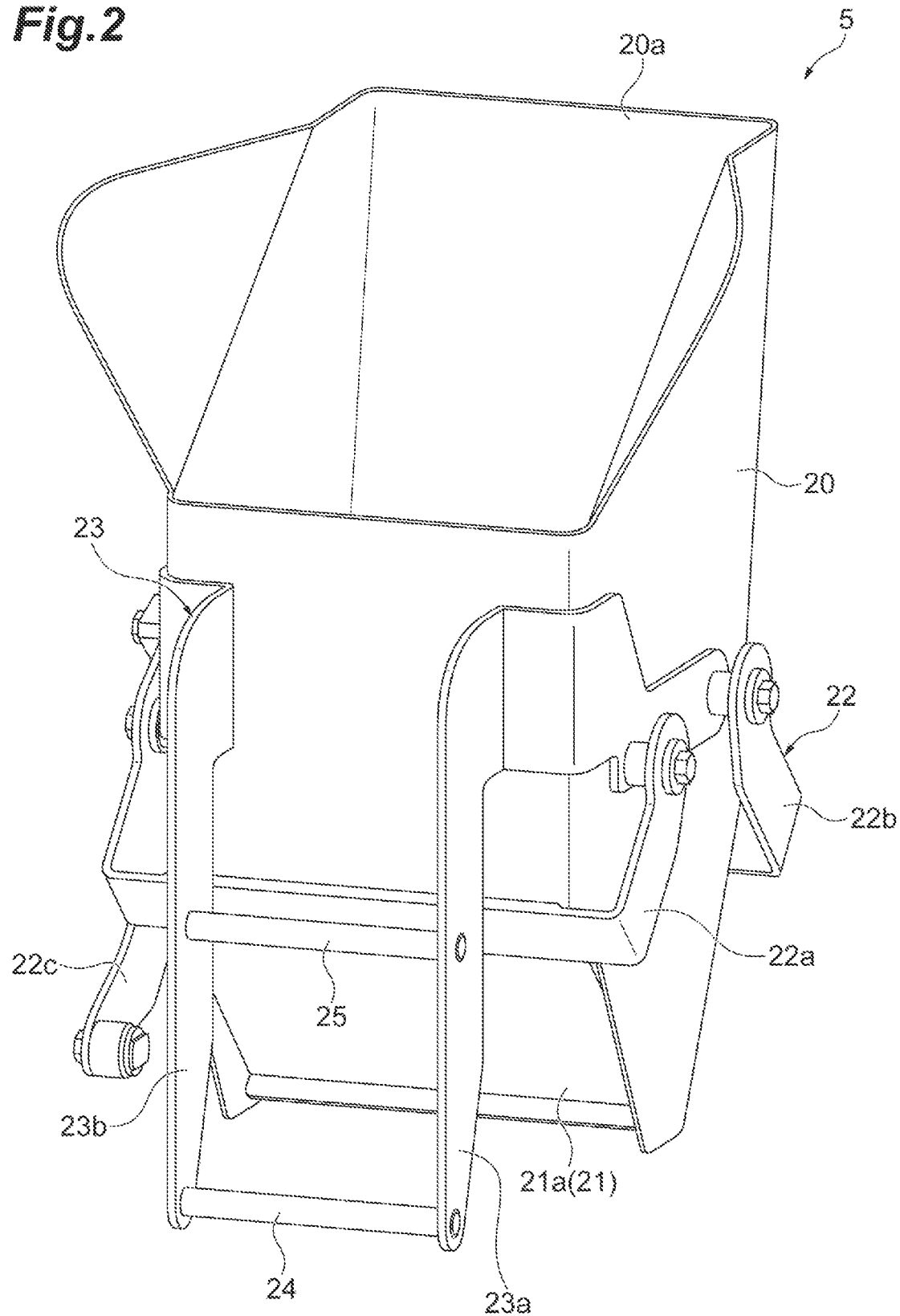
FIG. 2 is a perspective view illustrating a pool hopper.

Next, the configurations of the pool hopper 5 and the support body 11 will be described in detail. As illustrated in FIG. 2, the pool hopper 5 has a main body portion 20, the gate 21, a link mechanism 22, and an attachment portion 23. In the following description, terms for convenience such as "upper" and "lower" will be used with regard to the pool hopper 5 that is attached in the combination weighing apparatus 1. In addition, the up-down direction corresponds to the height direction of the support body 11 (combination weighing apparatus 1).

The main body portion 20 stores the article A. The main body portion 20 is a tube body. The main body portion 20 has an opening 20a where the article A is supplied and an opening (not illustrated) where the article A is discharged. The main body portion 20 has a lower side surface that tapers downward.

Figure 4:
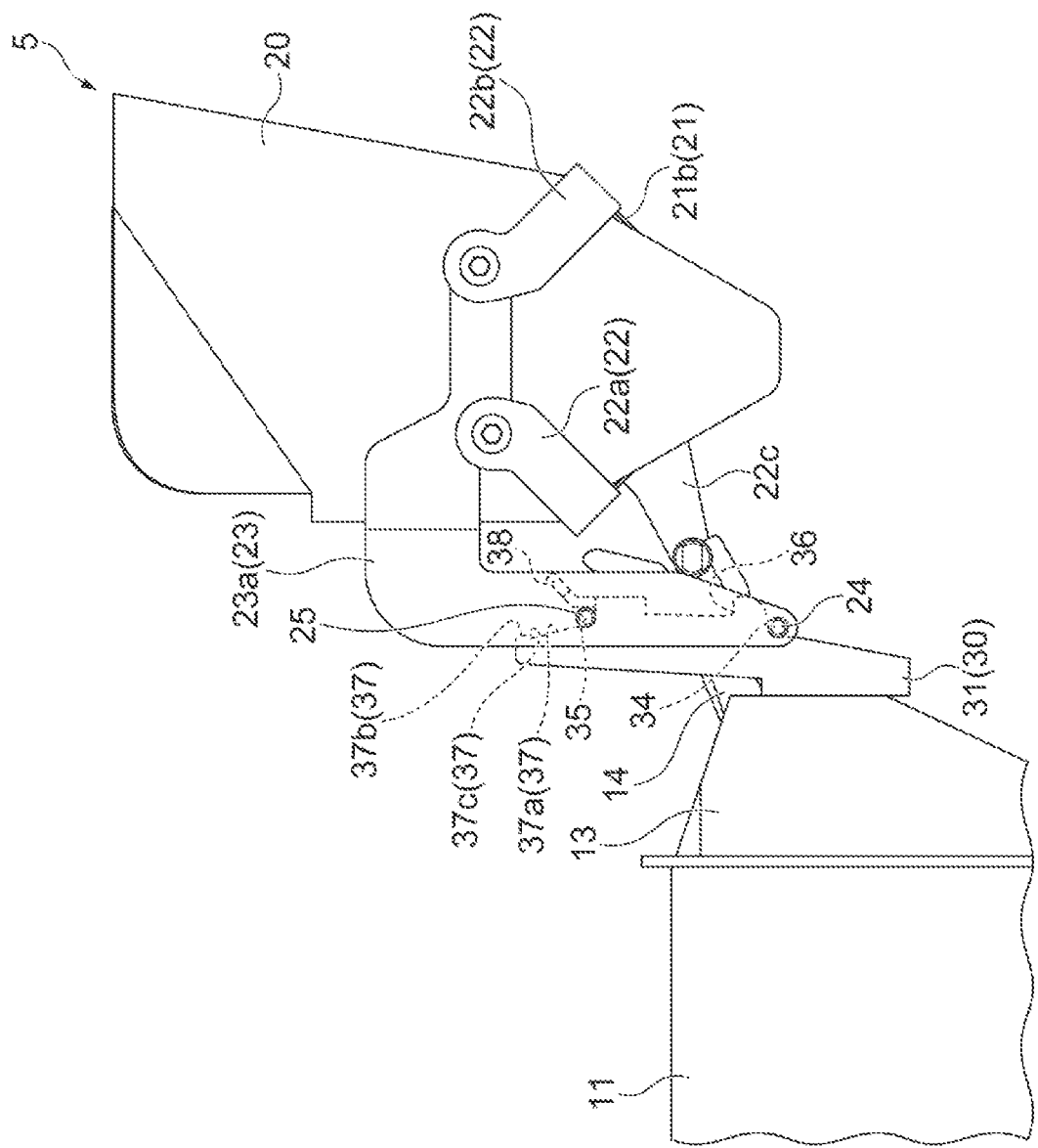
FIG. 4 is a diagram describing a pool hopper attachment method.

The gate 21 has a first gate 21a and a second gate 21b (see FIG. 4). Each of the first gate 21a and the second gate 21b can be opened and closed with respect to the opening on the lower side of the main body portion 20. The link mechanism 22 opens and closes the first gate 21a and the second gate 21b with respect to the opening on the lower side of the main body portion 20. The link mechanism 22 has a first movable portion 22a, a second movable portion 22b, and an operation portion 22c. The operation portion 22c is operated by a drive unit 14 (see FIG. 4). As a result, the first movable portion 22a and the second movable portion 22b of the link mechanism 22 are movable and the first gate 21a and the second gate 21b are opened and closed.

The attachment portion 23 has a configuration attachable to and detachable from an attached portion 30 (see FIG. 3) provided in the support body 11. The attachment portion 23 has a first attachment member 23a and a second attachment member 23b. The first attachment member 23a and the second attachment member 23b are attached to the side surface of the main body portion 20. Each of the first attachment member 23a and the second attachment member 23b extends along the up-down direction. The first attachment member 23a and the second attachment member 23b are disposed at a predetermined interval in the width direction of the main body portion 20.

The attachment portion 23 has a first locking member (first member) 24 and a second locking member (second member) 25. Each of the first locking member 24 and the second locking member 25 has, for example, a columnar shape. The first locking member 24 and the second locking member 25 are disposed (stretched) over the first attachment member 23a and the second attachment member 23b between the first attachment member 23a and the second attachment member 23b. The first locking member 24 and the second locking member 25 extend along the width direction of the main body portion 20. The first locking member 24 and the second locking member 25 are disposed at a predetermined interval in the up-down direction of the main body portion 20 (direction of movement of the article A). Specifically, the second locking member 25 is disposed above the first locking member 24 in the up-down direction of the main body portion 20. In other words, the first locking member 24 is disposed below the second locking member 25 in the up-down direction of the main body portion 20.

Figure 3:
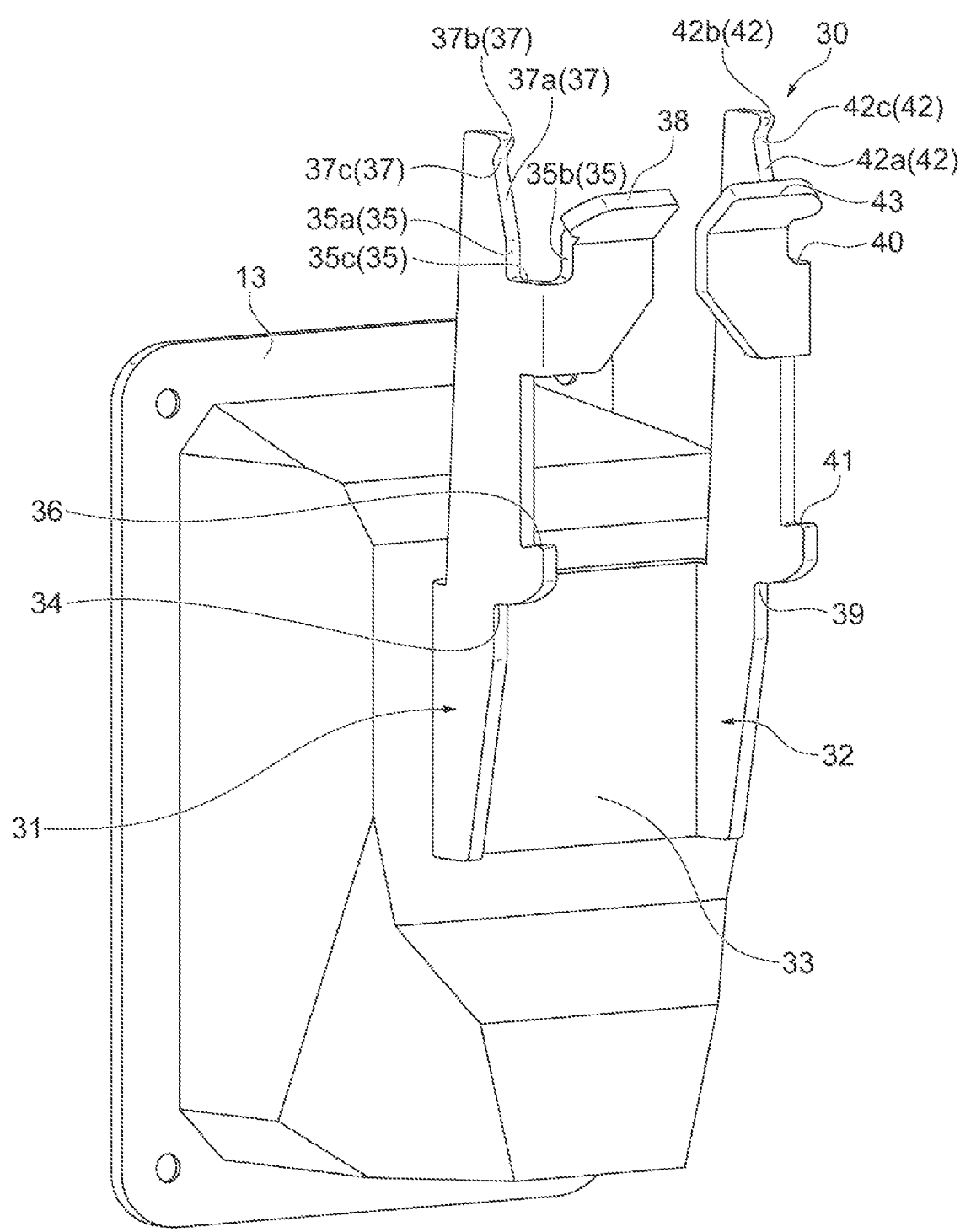
FIG. 3 is a perspective view illustrating an attached portion.

As illustrated in FIG. 3, the support body 11 has a plurality of the attached portions 30. The plurality of attached portions 30 are disposed at a predetermined interval in the circumferential direction of the support body 11. Each attached portion 30 is fixed to the support body 11 via a fixing portion 13. The attached portion 30 has a first support member 31, a second support member 32, and a fixed member 33, The first support member 31, the second support member 32, and the fixed member 33 are integrally formed. The fixed member 33 of the attached portion 30 is fixed to the fixing portion 13. As a result, the attached portion 30 is supported by the support body 11.

The first support member 31 and the second support member 32 extend along the up-down direction. The first support member 31 and the second support member 32 are disposed so as to face each other in the width direction of the pool hopper 5. The first support member 31 has a first defining portion 34, a second defining portion 35, a support portion 36, a guide portion 37, and an inclined portion 38. The second support member 32 has a first defining portion 39, a second defining portion 40, a support portion 41, a guide portion 42 (first inclined surface 42a, second inclined surface 42b, and recess portion 42c), and an inclined portion 43. The first support member 31 and the second support member 32 have the same configuration. Accordingly, the configuration of the first support member 31 will be described in detail below.

The first defining portion 34 defines the position of the first locking member 24 of the pool hopper 5 at the attachment position where the pool hopper 5 is attached to the support body 11 (position illustrated in FIG. 4). The first defining portion 34 is disposed on the track of the first locking member 24 at a time when the pool hopper 5 is swung to the support body 11 side about the second locking member 25 with the second locking member 25 held by the second defining portion 35. A recess portion formed by two intersecting surfaces constitutes the first defining portion 34 when viewed from the direction in which the first support member 31 and the second support member 32 face each other.

The second defining portion 35 defines the position of the second locking member 25 of the pool hopper 5 at the attachment position where the pool hopper 5 is attached to the support body 11 (position illustrated in FIG. 4). The second defining portion 35 has a recess shape when viewed from the direction in which the first support member 31 and the second support member 32 face each other. Specifically, the second defining portion 35 is configured to include a first regulating portion 35a, a second regulating portion 35b, and a placement portion 35c. The first regulating portion 35a is disposed below the guide portion 37 and configured to include a surface extending along the up-down direction. The second regulating portion 35b is disposed outside the first regulating portion 35a in the radial direction of the support body 11 and extends along the up-down direction. The placement portion 35c is positioned between the first regulating portion 35a and the second regulating portion 35b and configured to include a surface extending along the horizontal direction. The second defining portion 35 regulates a movement of the second locking member 25 in the radial direction of the support body 11 (direction orthogonal to the direction of extension of the second locking member 25 and the up-down direction) with the first regulating portion 35a and the second regulating portion 35b. The second defining portion 35 rotatably holds the second locking member 25.

The support portion 36 is disposed between the first defining portion 34 and the second defining portion 35 in the up-down direction. The support portion 36 is capable of supporting the first locking member 24. The support portion 36 protrudes toward the pool hopper 5 side beyond the front surface of the first support member 31. The support portion 36 supports the first locking member 24 on the upper surface of the support portion 36.

The guide portion 37 is disposed on the track of the second locking member 25 at a time when the pool hopper 5 is swung to the support body 11 side about the first locking member 24 with the first locking member 24 supported by the support portion 36. The guide portion 37 guides the second locking member 25 such that the second locking member 25 moves to the lower side in the up-down direction with respect to the position on the track and is positioned in the second defining portion 35. The guide portion 37 has a first inclined surface 37a, a second inclined surface 37b, and a recess portion 37c.

The first inclined surface 37a functions as a guide surface guiding the second locking member 25. The first inclined surface 37a is inclined downward with respect to the horizontal direction. The first inclined surface 37a is inclined at a falling gradient in the direction away from the support body 11 in the horizontal direction (radial direction of the support body 11). The upper end portion of the first inclined surface 37a is positioned on the track of the second locking member 25. The second inclined surface 37b is continuous with the upper end portion of the first inclined surface 37a. The second inclined surface 37b is inclined upward with respect to the horizontal direction. The second inclined surface 37b is inclined with a rising gradient in the direction away from the support body 11 in the horizontal direction. The lower end portion of the second inclined surface 37b is positioned on the track of the second locking member 25. The second inclined surface 37b is inclined such that the second inclined surface 37b and the first inclined surface 37a form an angle of 180° or less.

The recess portion 37c is provided in the upper end portion of the first inclined surface 37a (lower end portion of the second inclined surface 37b) and disposed at the position on the track of the second locking member 25. The recess portion 37c is formed by the first inclined surface 37a and the second inclined surface 37b. The recess portion 37c has a triangular shape when viewed from the direction in which the first support member 31 and the second support member 32 face each other. The distance between the support portion 36 and the recess portion 37c is equal to the distance between the first locking member 24 and the second locking member 25 of the pool hopper 5.

The inclined portion 38 is disposed below the track of the second locking member 25 in the up-down direction and at a position farther from the support body 11 in the horizontal direction than the guide portion 37. The inclined portion 38 is disposed in the upper end portion of the second regulating portion 35b of the second defining portion 35. The inclined portion 38 is capable of guiding the second locking member 25 with respect to the second defining portion 35 and inclined upward with respect to the horizontal direction. The inclined portion 38 is inclined in the direction away from the support body 11 in the horizontal direction.

As illustrated in FIG. 4, the attachment portion 23 of the pool hopper 5 is attached to the attached portion 30. Specifically, the pool hopper 5 is supported by the attached portion 30 with the first locking member 24 positioned in the first defining portions 34 and 39 of the attached portion 30 and the second locking member 25 positioned in the second defining portions 35 and 40 of the attached portion 30. In the pool hopper 5, the force of the first locking member 24 to move to the pool hopper 5 side and the force of the second locking member 25 to move to the support body 11 side act due to the weight of the main body portion 20. As a result, a movement of the first locking member 24 is regulated by the first defining portions 34 and 39 and a movement of the second locking member 25 is regulated by the second defining portions 35 and 40. Accordingly, the pool hopper 5 is held in the attached portion 30.

Next, a method (attachment method) for attaching the pool hopper 5 to the support body 11 will be described with reference to FIGS. 4 to 8.

Figure 5:
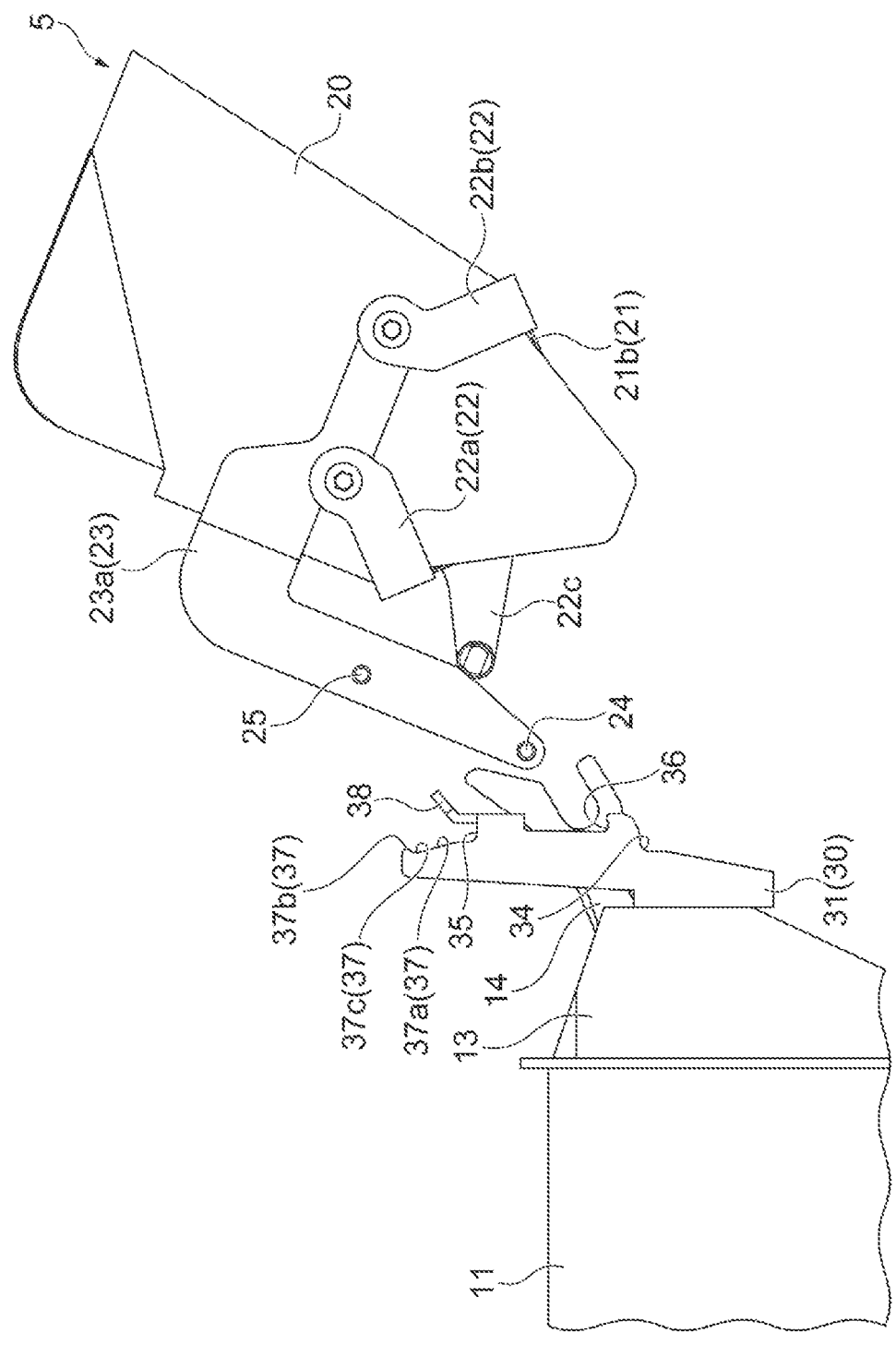
FIG. 5 is a diagram describing the pool hopper attachment method.
Figure 6:
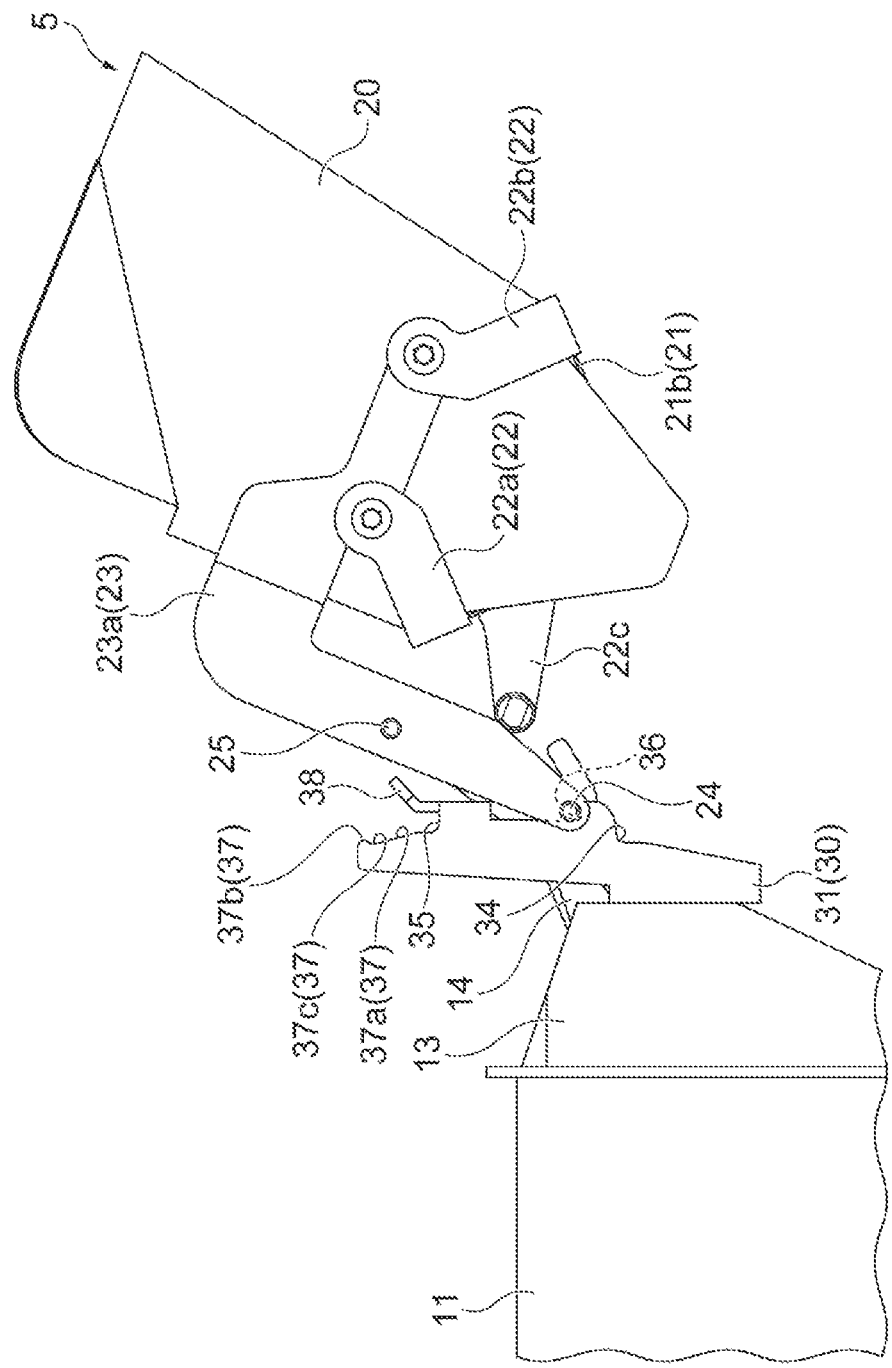
FIG. 6 is a diagram describing the pool hopper attachment method.

As illustrated in FIG. 5, the position of the support portion 36 (41) is confirmed such that the first locking member 24 of the pool hopper 5 is caught by the support portion 36 (41) of the attached portion 30, the pool hopper 5 is inclined, and the first locking member 24 is moved toward the support portion 36 (41). The pool hopper 5 is temporarily positioned with respect to the attached portion 30 when the first locking member 24 of the pool hopper 5 is supported by the support portion 36 (41) as illustrated in FIG. 6.

Figure 7:
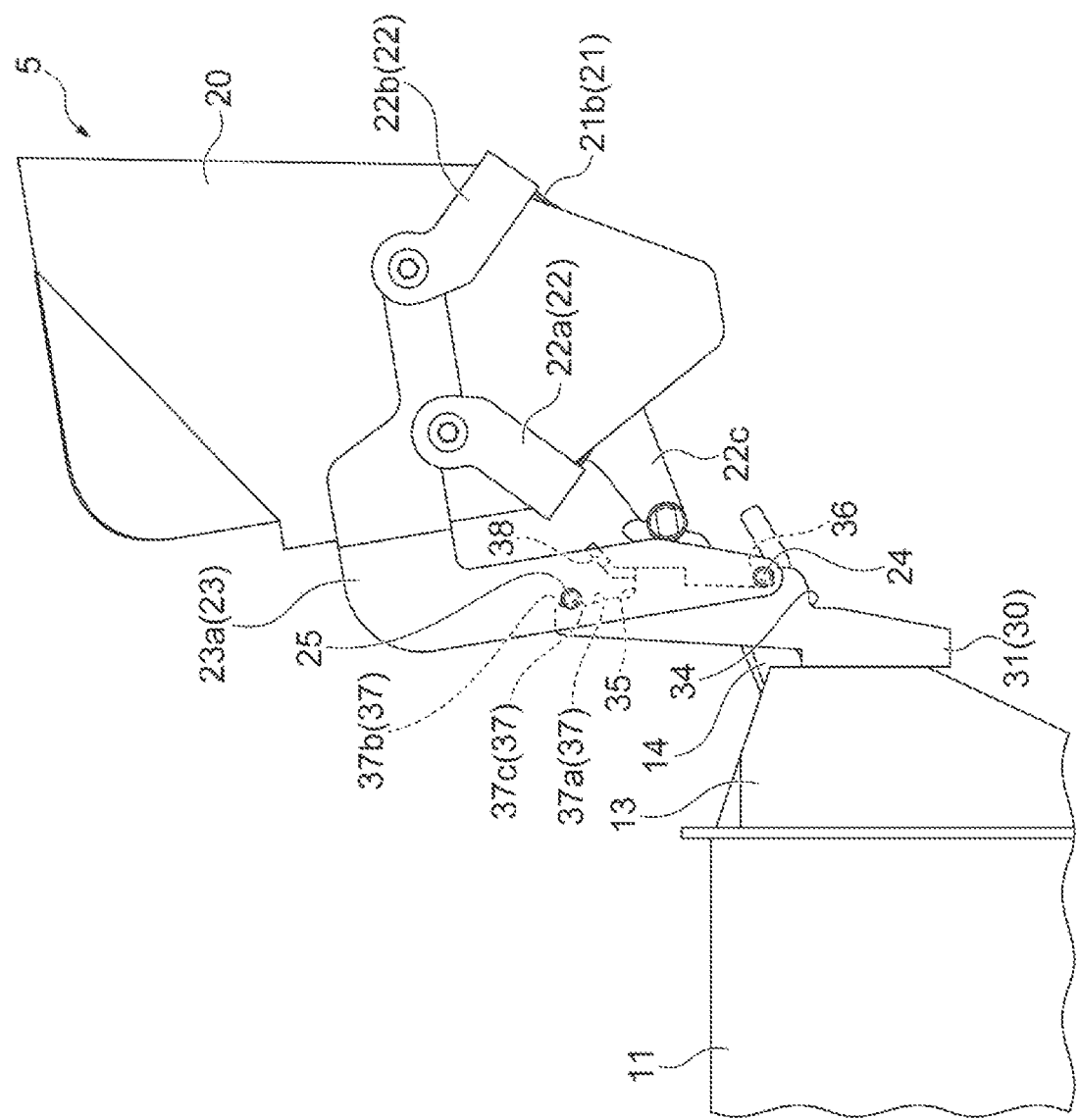
FIG. 7 is a diagram describing the pool hopper attachment method.

Subsequently, the pool hopper 5 is swung to the support body 11 side with the first locking member 24 of the pool hopper 5 used as a fulcrum as illustrated in FIG. 7. As a result, the pool hopper 5 pivots to the support body 11 side by using the first locking member 24 as a fulcrum. When the pool hopper 5 pivots, the second locking member 25 moves while drawing an arcuate track and the second locking member 25 abuts against the recess portion 37c (42c) of the guide portion 37 (42) of the attached portion 30. With the second locking member 25 abutting against the recess portion 37c (42c), the pool hopper 5 is further pushed to the support body 11 side and the pool hopper 5 is swung to the support body 11 side by the second locking member 25 of the pool hopper 5 being used as a fulcrum. As a result, the pool hopper 5 pivots to the support body 11 side by using the second locking member 25 as a fulcrum. Then, the first locking member 24 moves away from the support portion 36 (41) and the support by the support portion 36 (41) is released.

Figure 8:
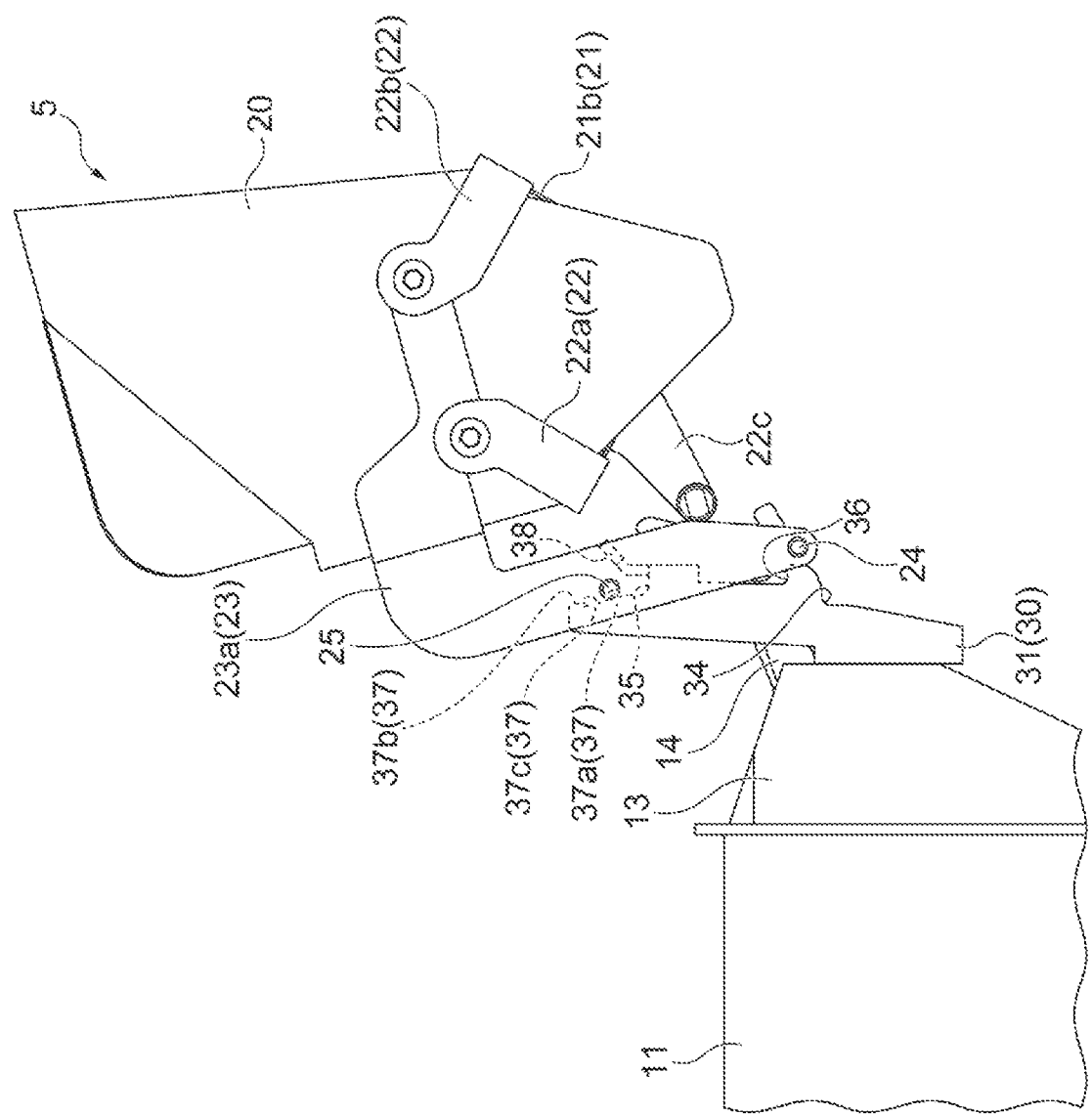
FIG. 8 is a diagram describing the pool hopper attachment method.

Subsequently, the pool hopper 5 becomes movable in the up-down direction with respect to the attached portion 30 when the support of the first locking member 24 by the support portion 36 (41) is released as illustrated in FIG. 8. When the second locking member 25 is slid along the first inclined surface 37a (42a) of the guide portion 37 (42), the second locking member 25 is guided to the second defining portion 35 (40) by the guide portion 37 (42) and positioned in the second defining portion 35 (40).

When the support by the support portion 36 (41) is released, the first locking member 24 moves downward with the movement of the second locking member 25. As a result, the first locking member 24 is positioned in the first defining portion 34 (39) disposed below the support portion 36 (41). As a result and as illustrated in FIG. 4, the first locking member 24 is positioned in the first defining portion 34 (39), the second locking member 25 is positioned in the second defining portion 35 (40), and the pool hopper 5 is attached to the attached portion 30 (support body 11).

As described above, in the combination weighing apparatus 1 according to the present embodiment, the attachment portion 23 of the pool hopper 5 has the first locking member 24 and the second locking member 25. The second locking member 25 is disposed upstream of the first locking member 24 in the direction of movement of the article A in the main body portion 20. In other words, in the pool hopper 5, the first locking member 24 is disposed on the lower side and the second locking member 25 is disposed on the upper side. In a case where the pool hopper 5 is attached to the support body 11, the first locking member 24 is brought close to the support portions 36 and 41 while the support portions 36 and 41 are (visually) confirmed with, for example, the pool hopper 5 inclined and the first locking member 24 is supported by the support portions 36 and 41. As a result, the pool hopper 5 can be temporarily positioned with respect to the support body 11. In a state where the first locking member 24 is supported by the support portions 36 and 41, the pool hopper 5 is swung to the support body 11 side about the first locking member 24. As a result, the second locking member 25 moves to the guide portions 37 and 42.

The pool hopper 5 can be swung about the second locking member 25 to the support body 11 side when the second locking member 25 reaches and abuts against the guide portions 37 and 42. The support of the first locking member 24 in the support portions 36 and 41 is released when the pool hopper 5 is further swung. As a result, the pool hopper 5 can be moved in the up-down direction, and thus the second locking member 25 is positioned in the second defining portions 35 and 40 by the second locking member 25 being moved along the guide portions 37 and 42. When the support in the support portions 36 and 41 is released, the first locking member 24 is positioned in the first defining portions 34 and 39 disposed below the support portions 36 and 41. In this manner, the first locking member 24 is positioned in the first defining portions 34 and 39 and the second locking member 25 is positioned in the second defining portions 35 and 40, and thus the pool hopper 5 can be attached to the support body 11. As described above, in the combination weighing apparatus 1, it is possible to attach the pool hopper 5 to the support body 11 while confirming the positional relationship between the attachment portion 23 of the pool hopper 5 and the attached portion 30 of the support body 11. Accordingly, the attachment workability of the pool hopper 5 can be improved in the combination weighing apparatus 1.

In the combination weighing apparatus 1 according to the present embodiment, the guide portions 37 and 42 have the first inclined surfaces 37a and 42a inclined downward with respect to the horizontal direction. The first inclined surfaces 37a and 42a are inclined away from the support body 11 in the horizontal direction. When the second locking member 25 is moved along the first inclined surfaces 37a and 42a in this configuration, the first locking member 24 moves away from the support portions 36 and 41, and thus the support of the first locking member 24 in the support portions 36 and 41 can be released more reliably.

In the combination weighing apparatus 1 according to the present embodiment, the guide portions 37 and 42 have the recess portions 37c and 42c provided in the upper end portions of the first inclined surfaces 37a and 42a and disposed at the positions on the track of the second locking member 25. The distance between the support portions 36 and 41 and the recess portions 37c and 42c is equal to the distance between the first locking member 24 and the second locking member 25 of the pool hopper 5. In this configuration, it is possible to more reliably release the support of the first locking member 24 in the support portions 36 and 41 by swinging the pool hopper 5 to the support body 11 side about the second locking member 25 in the recess portions 37c and 42c.

In the combination weighing apparatus 1 according to the present embodiment, the attached portion 30 has the inclined portions 38 and 43 disposed below the track of the second locking member 25 in the up-down direction and at positions farther from the support body 11 in the horizontal direction than the guide portion 37, capable of guiding the second locking member 25 with respect to the second defining portions 35 and 40, and inclined upward with respect to the horizontal direction. The inclined portions 38 and 43 are inclined away from the support body 11 in the horizontal direction. In this configuration, the second locking member 25 can be guided with respect to the second defining portions 35 and 40 by the guide portions 37 and 42 and the inclined portions 38 and 43. Accordingly, the second locking member 25 can be reliably positioned in the second defining portions 35 and 40. The inclined portions 38 and 43 are inclined upward in the direction away from the support body 11 in the horizontal direction. Accordingly, the inlet of the second locking member 25 with respect to the second defining portions 35 and 40 becomes wide. As a result, the second locking member 25 can be more reliably positioned in the second defining portions 35 and 40.

Although an embodiment of the present invention has been described above, the present invention is not necessarily limited to the embodiment described above and various modifications can be made within the scope of the invention.

A form in which the guide portions 37 and 42 have the first inclined surfaces 37a and 42a, the second inclined surfaces 37b and 42b, and the recess portions 37c and 42c has been described as an example in the embodiment described above. However, the guide portion may not have the first inclined surfaces 37a and 42a, the second inclined surfaces 37b and 42b, and the recess portions 37c and 42c. In this case, the guide portion may have at least a surface guiding the second locking member 25 to the second defining portions 35 and 40 (such as a surface extending along the up-down direction).

Figure 9:
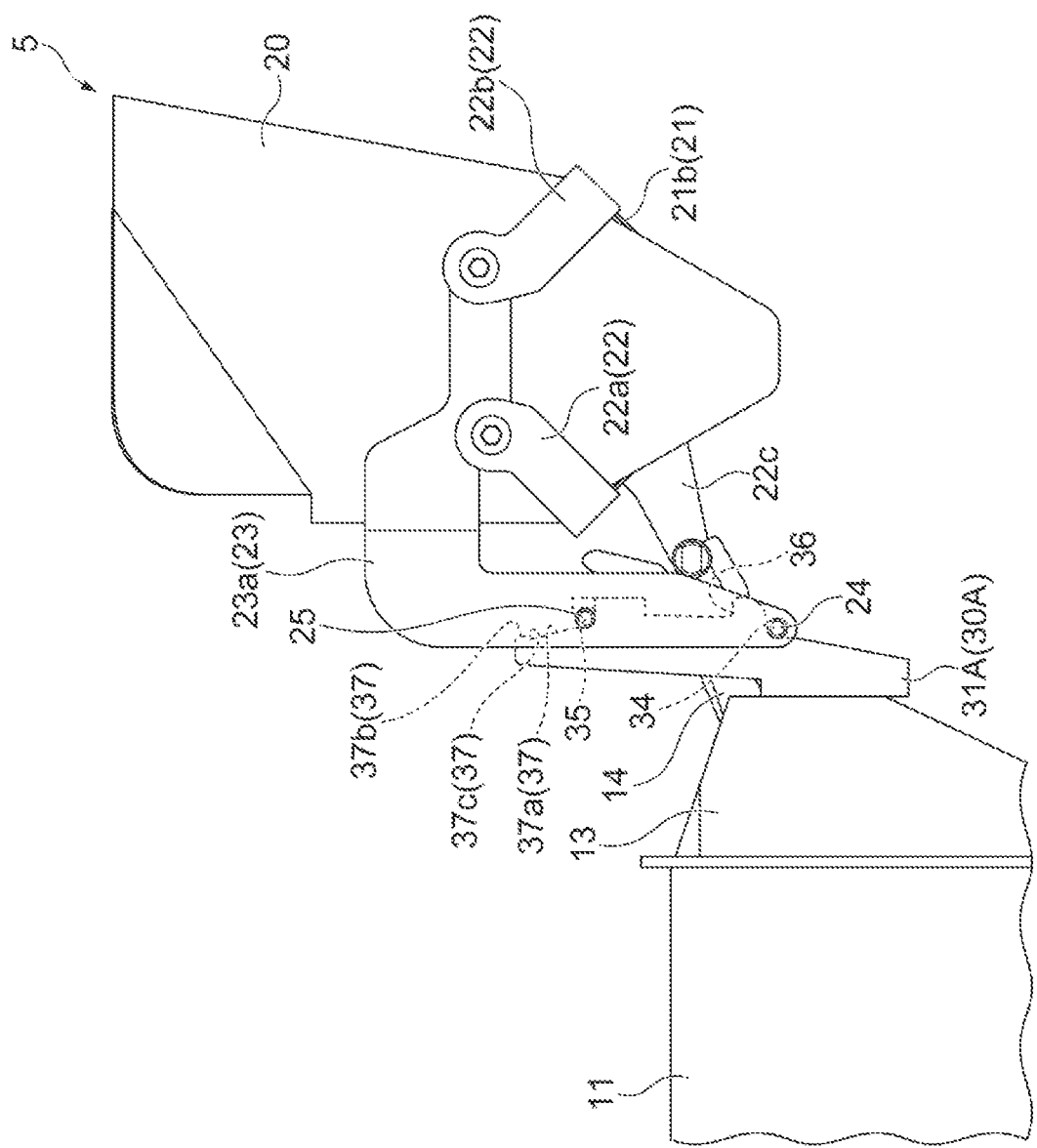
FIG. 9 is a diagram illustrating a pool hopper and an attached portion according to another embodiment.

A form in which the attached portion 30 has the inclined portions 38 and 43 has been described as an example in the embodiment described above. However, a first support member 31A of an attached portion 30A may lack the inclined portions 38 and 43 as illustrated in FIG. 9. The same applies to the second support member.

A form in which the pool hopper 5 is attached to the support body 11 has been described as an example in the embodiment described above. However, the weighing hopper 6 may also have the same configuration as the pool hopper 5. In addition, a form in which the pool hopper 5 and the weighing hopper 6 are provided as hoppers has been described as an example. However, a booster hopper to which the article A is supplied from the weighing hopper 6 may be further provided.

A form in which the dispersion feeder 3 transports the article A by vibration has been described as an example in the embodiment described above. However, the dispersion feeder 3 may transport the article A by the transport surface 3a rotating.

A form in which the radiation feeder 4 transports the article A by vibration has been described as an example in the embodiment described above. However, the radiation feeder 4 may transport the article A by means of a rotationally drivable coil unit (screw) or a belt conveyor. In the case of the coil unit, the control unit 12 controls the rotation speed (rpm) of the coil unit or the like as a transport force. In addition, in the case of the belt conveyor, the control unit 12 controls the rotation speed of a belt drive roller or the like.

The present invention from another perspective is a combination weighing apparatus including a hopper temporarily holding an article and discharging the article and a support body detachably supporting the hopper. The hopper has a main body portion holding the article and an attachment portion attaching the main body portion to the support body. The attachment portion has a first member extending along a width direction of the main body portion and a second member disposed upstream of the first member in a direction of movement of the article in the main body portion and extending along the width direction. The support body has an attached portion to which the attachment portion of the hopper is attached. The attached portion has a first defining portion defining a position of the first member and a second defining portion defining a position of the second member at an attachment position where the hopper is attached to the support body. The second defining portion regulates a movement in a direction orthogonal to the direction of extension of the second member and the height direction of the support body and rotatably holds the second member. The first defining portion is disposed on the track of the first member at a time when the hopper is swung to the support body side about the second member with the second member held by the second defining portion.

In the combination weighing apparatus described above, the attachment portion of the hopper has the first member and the second member. The second member is disposed upstream of the first member in the direction of movement of the article in the main body portion. In other words, in the hopper, the first member is disposed on the lower side and the second member is disposed on the upper side. In a case where the hopper is attached to the support body, the second member is positioned in the second defining portion first. In this state, the hopper is capable of swinging about the second support portion. Then, the first member of the hopper is swung toward the support body. In other words, the hopper is swung to the support body side. It should be noted that the hopper swings, due to the weight of the main body portion and even with a worker exerting no force, when the second member is held by the second defining portion. In the attached portion, the first defining portion is disposed on the track of the first member. Accordingly, the first member is positioned in the first defining portion as the hopper swings. The first member is positioned in the first defining portion and the second member is positioned in the second defining portion in this manner, and thus the hopper can be attached to the support body. As described above, the combination weighing apparatus does not require the work of the related art for hooking four hooks at the same time. In the combination weighing apparatus, the hopper can be attached to the support body by work for positioning the second member in the second defining portion. Accordingly, the attachment workability of the hopper can be improved in the combination weighing apparatus.

Figure 10:
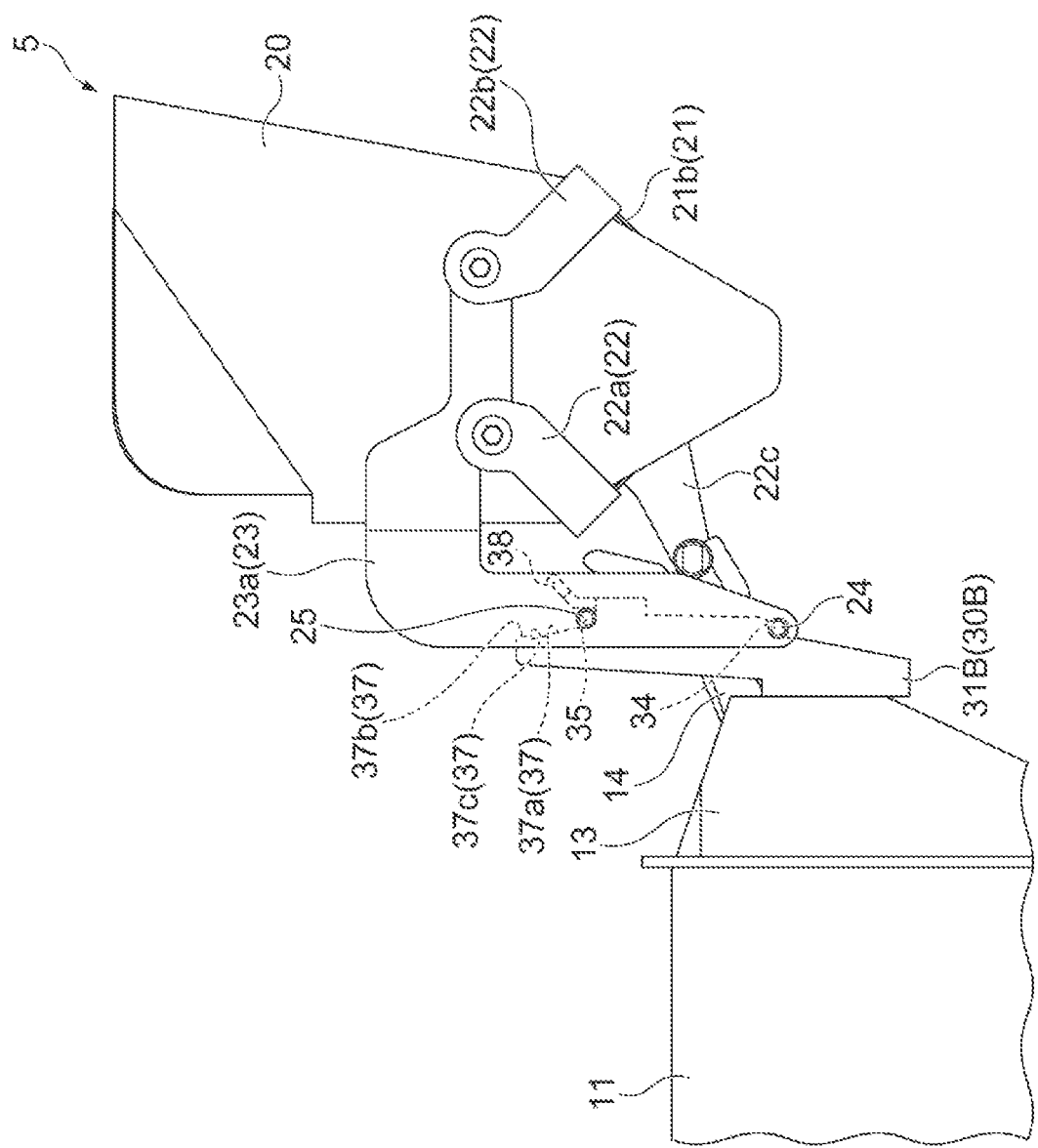
FIG. 10 is a diagram illustrating a pool hopper and an attached portion according to another embodiment.

The combination weighing apparatus described above will be described with reference to FIG. 10. As illustrated in FIG. 10, an attached portion 30B has a first support member 31B. The first support member 31B has the first defining portion 34, the second defining portion 35, the guide portion 37, and the inclined portion 38. It should be noted that a second support member (not illustrated in FIG. 10) having the same configuration as the first support member 31B is disposed at a position facing the first support member 31B. The first support member 31B is different in configuration from the first support member 31 in that the first support member 31B does not have the support portion 36 in the first support member 31.

A method (attachment method) for attaching the pool hopper 5 to the support body 11 will be described. First, the second locking member 25 is moved toward the second defining portion 35 such that the second locking member 25 of the pool hopper 5 is caught by the second defining portion 35 of the attached portion 30.

Subsequently, the pool hopper 5 is swung to the support body 11 side with the second locking member 25 of the pool hopper 5 used as a fulcrum. As a result, the pool hopper 5 pivots to the support body 11 side by using the second locking member 25 as a fulcrum. When the pool hopper 5 pivots, the first locking member 24 moves while drawing an arcuate track and the first locking member 24 abuts against the first defining portion 34 of the attached portion 30. As a result, the first locking member 24 is positioned in the first defining portion 34. As described above and as illustrated in FIG. 10, the first locking member 24 is positioned in the first defining portion 34, the second locking member 25 is positioned in the second defining portion 35, and the pool hopper 5 is attached to the attached portion 30 (support body 11).

It should be noted that the inclined portion 38 may not be provided although a form in which the first support member 31B has the inclined portion 38 has been described as an example.

A form in which the first support member 31 and the second support member 32 linearly extend in the up-down direction has been described as an example in the embodiment described above. However, the configurations of the first support member and the second support portion are not limited thereto.

Figure 11:
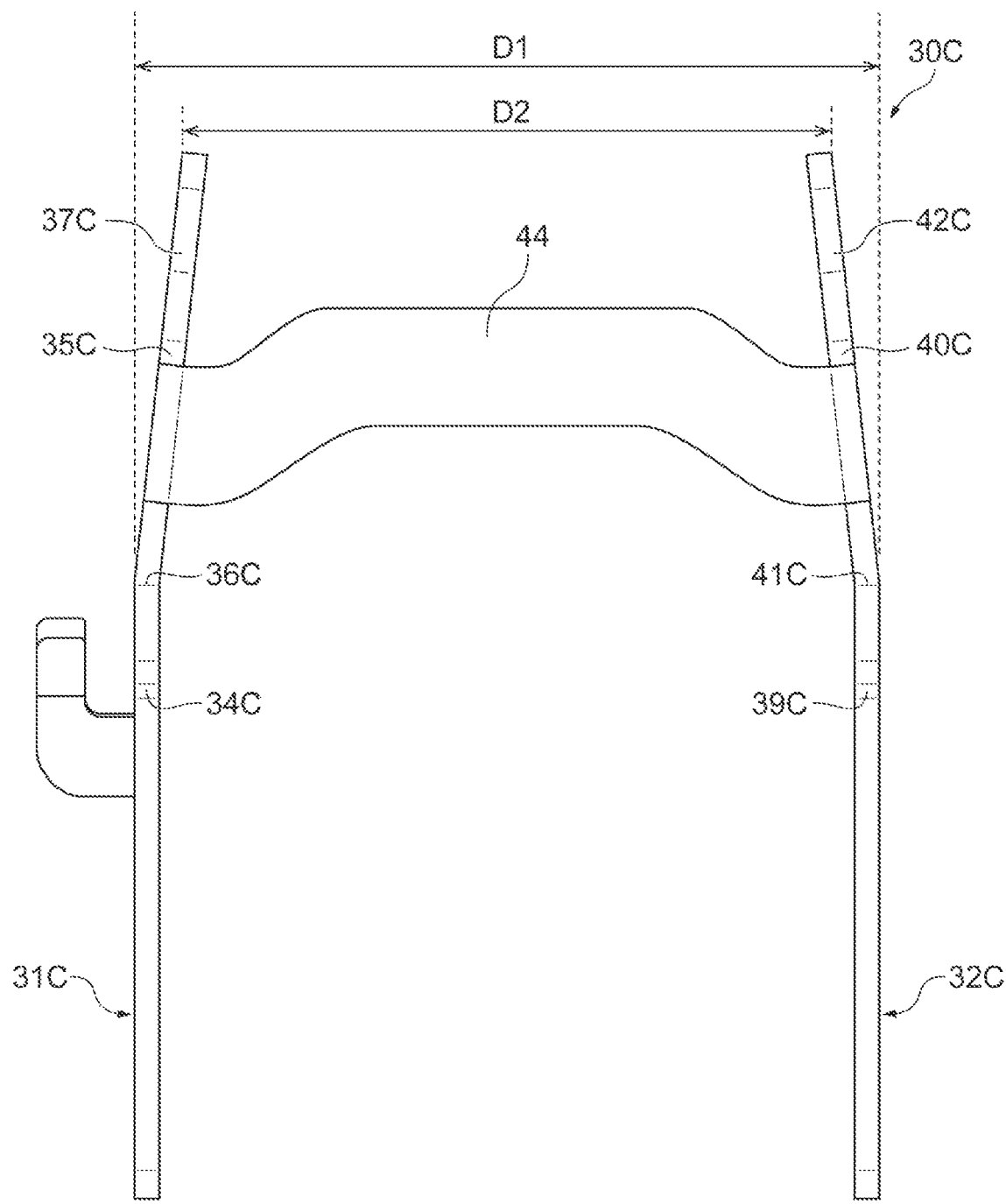
FIG. 11 is a diagram illustrating an attached portion according to another embodiment.
Figure 12:
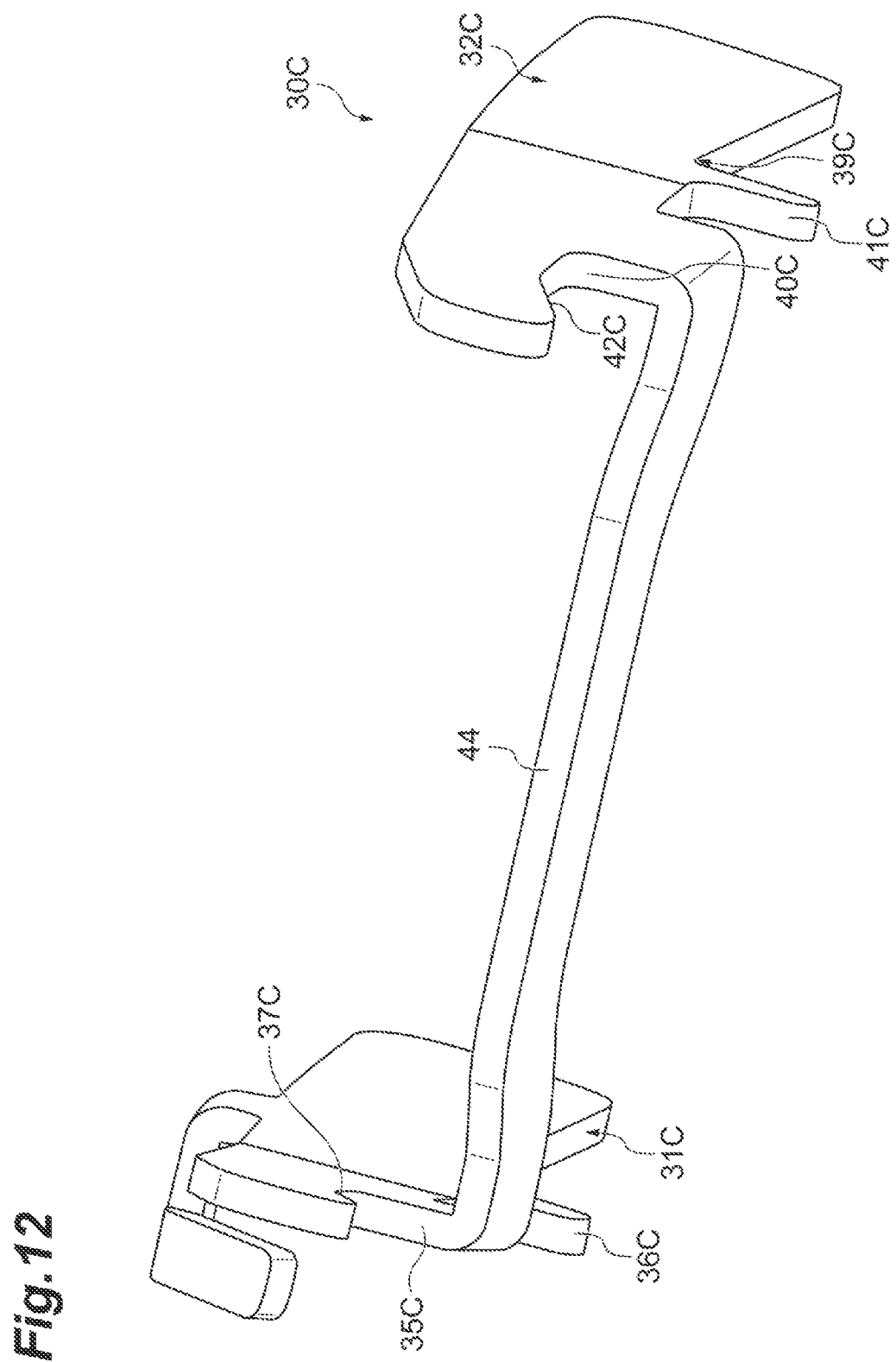
FIG. 12 is a perspective view in which the attached portion illustrated in FIG. 11 is viewed from above.

As illustrated in FIGS. 11 and 12, an attached portion 30C has a first support member 31C, a second support member 32C, and a connecting portion 44. The first support member 31C, the second support member 32C, and the connecting portion 44 are integrally formed. The attached portion 30C is used for the support body 11 that supports the weighing hopper 6.

The first support member 31C and the second support member 32C extend in the up-down direction. The first support member 31C and the second support member 32C are disposed so as to face each other in the width direction of the weighing hopper 6. The first support member 31C has a first defining portion 34C, a second defining portion 35C, a support portion 36C, and a guide portion 37C. The second support member 32C has a first defining portion 39C, a second defining portion 40C, a support portion 41C, and a guide portion 42C.

The distance between the first support member 31C and the second support member 32C in the width direction decreases upward from the support portions 36C and 41C. A distance D1 between the first support member 31C and the second support member 32C at the positions of the support portions 36C and 41C is longer than a distance D2 between the first support member 31C and the second support member 32C at the positions of the respective upper portions of the first support member 31C and the second support member 32C (D1>D2). In the present embodiment, the distance between the first support member 31C and the second support member 32C is the distance between the width-direction outer surfaces of the first support member 31C and the second support member 32C.

When viewed from the radial direction of the support body 11, the first support member 31C is bent at the position of the support portion 36C and inclined toward the inner side in the width direction from the position of the support portion 36C as a starting point. Likewise, when viewed from the radial direction of the support body 11, the second support member 32C is bent at the position of the support portion 41C and inclined toward the inner side in the width direction from the position of the support portion 41C as a starting point. In this configuration, the distance between the first support member 31C and the second support member 32C in the width direction gradually decreases upward from the support portions 36C and 41C. In other words, the first support member 31C and the second support member 32C have upper side parts that gradually approach each other toward the upper side.

The connecting portion 44 connects the first support member 31C and the second support member 32C. The connecting portion 44 extends along the width direction of the weighing hopper 6. The connecting portion 44 has a projecting shape when viewed from the radial direction of the support body 11. The connecting portion 44 functions as a regulating portion that regulates a movement of the second locking member 25. The connecting portion 44 regulates a movement of the second locking member 25 in the radial direction of the support body 11 (direction orthogonal to the direction of extension of the second locking member 25 and the up-down direction).

As described above, the attached portion 30C has the first support member 31C and the second support member 32C disposed so as to face each other in the width direction of the weighing hopper 6 and extending in the height direction of the support body 11. The distance between the first support member 31C and the second support member 32C in the width direction decreases upward from the support portions 36C and 41C. When the weighing hopper 6 is attached to the support body 11, the first locking member 24 is brought close to the support portions 36C and 41C while the support portions 36C and 41C are (visually) confirmed and the first locking member 24 is supported by the support portions 36C and 41C. At this time, the attached portion 30C may be looked down and it may be difficult for a worker to see the support portions 36C and 41C depending on the height position of the support body 11. In this case, it may not be easy to support the first locking member 24 on the support portions 36C and 41C. In the attached portion 30C, the width-direction distance between the first support member 31C and the second support member 32C provided with the support portions 36C and 41C decreases upward from the support portions 36C and 41C. In other words, in the attached portion 30C, the width of the part above the support portions 36C and 41C decreases. As a result and as illustrated in FIG. 12, the upper side parts of the first support member 31C and the second support member 32C do not block the view when the attached portion 30C is looked down, and thus it is possible to confirm the support portions 36C and 41C. Accordingly, in the combination weighing apparatus, it is possible to bring the first locking member 24 close to the support portions 36C and 41C while confirming the support portions 36C and 41C and the first locking member 24 can be supported by the support portions 36C and 41C. As a result, the attachment workability of the weighing hopper 6 can be improved in the combination weighing apparatus.

REFERENCE SIGNS LIST

1: combination weighing apparatus, 5: pool hopper, 11: support body, 23: attachment portion, 24: first locking member (first member), 25: second locking member (second member), 30, 30A, 30B, 30C: attached portion, 34, 39, 34C, 39C: first defining portion, 35, 40, 35C, 40C: second defining portion, 36, 41, 36C, 41C: support portion, 37, 42, 37C, 42C: guide portion, 37a, 42a: first inclined surface, 37c, 42c: recess portion, 38, 43: inclined portion, A: article.

The invention claimed is:

1. A combination weighing apparatus comprising:
  a hopper temporarily holding an article and discharging the article; and
  a support body detachably supporting the hopper, wherein the hopper has:
  a main body portion holding the article; and
  an attachment portion attaching the main body portion to the support body,
  the attachment portion has a first member extending along a width direction of the main body portion and a second member disposed upstream of the first member in a direction of movement of the article in the main body portion and extending along the width direction,
  the support body has an attached portion to which the attachment portion of the hopper is attached, and
  the attached portion has:
  a first defining portion defining a position of the first member and a second defining portion defining a position of the second member at an attachment position where the hopper is attached to the support body;
  a support portion disposed between the first defining portion and the second defining portion in a height direction of the support body and capable of supporting the first member; and
  a guide portion disposed on a track of the second member at a time when the hopper is swung to the support body side about the first member with the first member supported by the support portion and guiding the second member such that the second member moves to a lower side in the height direction with respect to a position on the track and is positioned in the second defining portion.

2. The combination weighing apparatus according to claim 1, wherein
  the guide portion has an inclined surface inclined downward with respect to a horizontal direction, and
  the inclined surface is inclined in a direction away from the support body in the horizontal direction.

3. The combination weighing apparatus according to claim 2, wherein
  the guide portion has a recess portion provided in an upper end portion of the inclined surface and disposed at a position on the track of the second member, and
  a distance between the support portion and the recess portion is equal to a distance between the first member and the second member of the hopper.

4. The combination weighing apparatus according to claim 2, wherein
  the attached portion has an inclined portion disposed below the track of the second member in the height direction and at a position farther from the support body in the horizontal direction than the guide portion, capable of guiding the second member with respect to the second defining portion, and inclined upward with respect to the horizontal direction, and
  the inclined portion is inclined in a direction away from the support body in the horizontal direction.

5. The combination weighing apparatus according to claim 1, wherein
  the attached portion has a first support member and a second support member disposed so as to face each other in the width direction,
  each of the first support member and the second support member has the first defining portion, the second defining portion, the support portion, and the guide portion, and
  a distance between the first support member and the second support member in the width direction decreases upward from the support portion.

6. The combination weighing apparatus according to claim 5, wherein
  the hopper is a weighing hopper, and
  the attached portion of the support body supports the weighing hopper.

\* \* \* \* \*